United States Patent [19]
Imanishi et al.
[11] Patent Number: 4,677,908
[45] Date of Patent: Jul. 7, 1987

[54] SLIDE ADJUSTING DEVICE FOR A PRESS

[75] Inventors: Shozo Imanishi; Mitsuo Sato, both of Sagamihara, Japan
[73] Assignee: Aida Engineering, Ltd., Kanagawa, Japan

[21] Appl. No.: 804,251
[22] Filed: Dec. 3, 1985
[51] Int. Cl.[4] ........................ B30B 1/26; F16H 1/16
[52] U.S. Cl. ........................ 100/53; 100/257; 74/89.15; 74/424.8 R; 74/425
[58] Field of Search ........................ 74/425, 424.6, 424.8 R, 74/89.15, 829; 100/53, 257

[56] References Cited

U.S. PATENT DOCUMENTS 3,585,867 6/1971 Grimshaw .................... 74/89.15
4,011,809 3/1977 Waller et al. .................... 100/257
4,166,415 9/1979 Spanke et al. .................... 100/53
4,289,066 9/1981 Proga .................... 100/53

FOREIGN PATENT DOCUMENTS 47-33111 8/1972 Japan .................... 100/257

Primary Examiner—Cornelius J. Husar
Assistant Examiner—Peter M. Cuomo
Attorney, Agent, or Firm—Wenderoth, Lind & Ponack

[57] ABSTRACT

A press having a slide adjusting device and which has a press crown, a crank shaft mounted on the crown and having an eccentric portion, a connecting rod mounted on the eccentric portion, a slide adjusting screw connected to the connecting rod, a worm wheel mounted on the outer periphery of the slide adjusting screw for rotating the slide adjusting screw with the worm wheel and for relative axial sliding movement of the slide adjusting screw and the worm wheel, a crown engaging the worm wheel for holding the worm wheel fixed against movement in the vertical direction relative to the press crown, whereby the slide adjusting screw is moved in the rotational direction by rotation of the worm wheel and is slidable in the vertical direction in the worm wheel. A worm shaft is engaged with the worm wheel for rotating the worm wheel, a motor is mounted on the press crown and connected to the worm shaft for driving the worm shaft, a press slide is threadedly engaged by the outer periphery of the slide adjusting screw at the lower end thereof, a piston is vertically movably mounted on the press slide means with the upper portion thereof threaded to the lower end of the slide adjusting screw, the piston and the slide defining an oil pressure chamber therebetween, and a pump is provided for supplying oil under pressure to the oil pressure chamber and includes a control valve for controlling the level of the oil pressure.

4 Claims, 4 Drawing Figures

SLIDE ADJUSTING DEVICE FOR A PRESS

DETAILED DESCRIPTION OF THE INVENTION

Field of Industrial Application

The present invention relates to a slide adjusting device for a press which enables adjustment of slide height and release of sticking.

Prior Art and its Problems

In case so-called sticking of the material to be processed in the die occurs during a press operation, the press stops operating because of elastic deformation (under pressure) due to sticking of the material in the die or its counter force and the slide becomes inoperable. Generally, a crank is operated in the reverse direction by increasing the clutch torque capacity to release this sticking between the die and the material. However, the procedure is often ineffective and it becomes necessary to employ other methods; for example, the die is cooled to release the stuck material, or a jack is inserted between the slide and the bed to move the slide away. Alternatively, in a press having an assembled frame structure, the slide is moved by elongating the tie rod by heating, or the die holder or the connecting rod of the press is cut to release the stuck portion. The press itself or the die must be broken under certain circumstances.

Overload protectors utilizing oil pressure are found to exhibit not only overload protection but function to release sticking and are therefore effective in general purpose presses. In case of high speed blanking, precision punching, multi-functional progressing and the like operations where a high precision press process is required, however, the conventional overload protector is not usable because of difficulties in the mechanical precision and safety of its performance.

Still another way to release sticking is a method in which a wedge member is interposed between a member which moves up and down with the rotation of the crank shaft and the slide so that the wedge member can be displaced whenever sticking occurs and the press stops operating due to insufficient energy or excessive torque. The length of the slide is thus reduced to release the sticking.

The above described device results in too complicated a construction as it requires an additional wedge member which is irrelevant to the essential functions of the press. The method in which sticking is released by displacing the wedge member is defective in that since the wedge member must be displaced for overcoming the pressure occurring at the time of sticking, a large size oil pressure cylinder and the like must be provided, thereby inconveniently increasing the size of a press.

When a die attached to a slide is changed, the slide is accordingly adjusted to a height to suit the die. As a method for doing this, a worm wheel which is held vertically unmovable is provided on a connecting rod which connects a crank shaft and the slide so as to displace the slide relative to the connecting rod by rotating the worm wheel via a worm shaft driven by a motor.

Generally in the prior art, as the worm shaft is axially positioned relative to the slide, the motor which actuates the worm shaft is also provided on the slide. However, since the slide moves up and down when the press is in operation and is constantly exposed to impact, the driving motor mounted on the performance of the slide is very likely to deteriorate.

OBJECT AND BRIEF SUMMARY OF THE INVENTION

An object of the present invention is to provide a device which not only quickly releases sticking of the material from the die but enables high precision adjustment of slide and overload protection.

In order to achieve this object, the device according to the present invention is characterized in that a slide adjusting screw connected to a connecting rod which moves up and down with the rotation of a crank shaft is provided with a worm wheel which rotates together with the rotation of the adjusting screw and freely moves in the axial direction so that the worm wheel can be driven in rotation by a motor which has a worm shaft and which is mounted on the crown. This inventive device is further characterized in that a slide which is threaded to the lower end of a slide adjusting screw and a piston which is vertically movably mounted on the slide with its upper portion threaded to said adjusting screw are provided so that oil pressure can be supplied to an oil pressure chamber formed between the piston and the slide.

During normal operation of the press, an oil pressure higher than the pressure of the press is supplied to and maintained in the oil pressure chamber to eliminate backlash of the slide adjusting screw. When sticking occurs as the press stops operating due to insufficient energy or excessive torque, pressure in the oil pressure chamber is released to allow vertical movement of the slide to thereby release the stuck portion.

As the pressing force is applied to the slide via the oil pressure in the oil pressure chamber in the present invention, overload can be prevented by controlling the pressure in the oil pressure chamber at an adequate level. At the same time, by releasing the pressure in the oil pressure chamber, the slide is allowed to move vertically and thereby absorb the pressure caused by sticking between the slide die and the material to thereby release sticking.

Further, as the backlash of the slide adjusting screw can be eliminated by the upward pushing force acting on the piston, the relative position of the connecting rod and the slide can be coordinated constantly with higher precision to enable high precision operations at high speed.

Further, as the driving motor for rotating the worm shaft which engages with the worm wheel for adjusting the slide height is mounted on the crown, the motor will not be exposed to impact from the press operation and thus can be protected against deterioration of its performance.

DETAILED DESCRIPTION OF THE INVENTION

Figure 1:
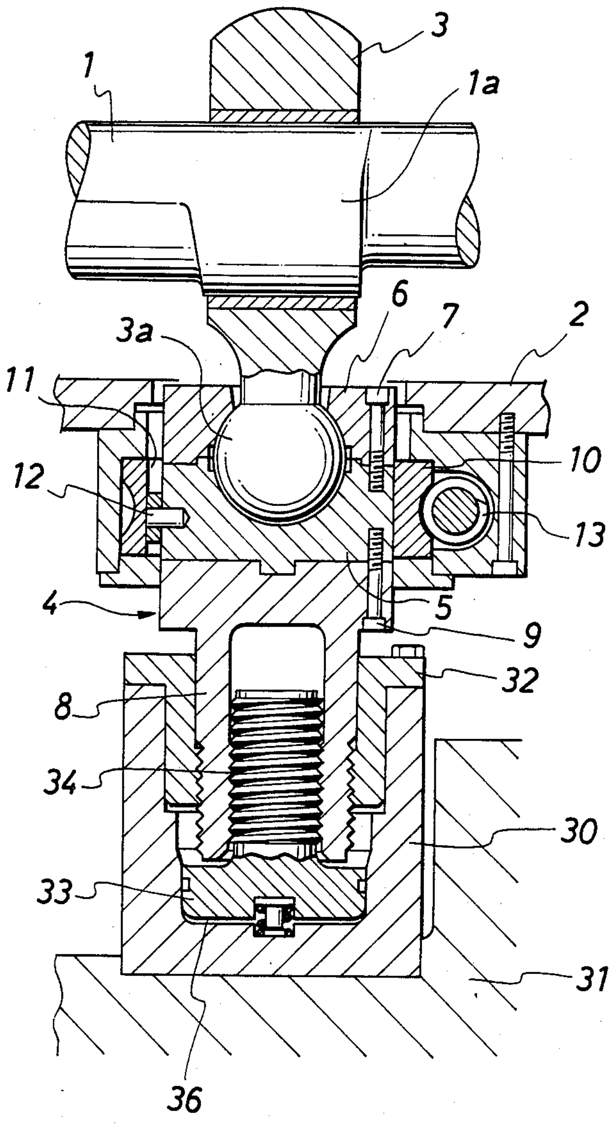
FIG. 1 is a sectional view showing the present invention device assembled in a press.

A crank shaft 1 is rotatably mounted on a crown 2 of a press in a conventional manner (not shown) and is rotatably driven by a rotation driving mechanism (not shown). A connecting rod 3 is mounted on an eccentric portion 1*a* of the crank shaft 1 and a spherical portion 3*a* formed at the lower end of the connecting rod 3 is connected to slide adjusting screw 4 which is connected to a slide to be described later.

The slide adjusting screw 4 comprises a bearing 5 which contacts the lower face of the spherical portion 3*a* and a bearing cap 6 which contacts the upper face of the portion 3*a*. A hollow cylindrical internally threaded sleeve 8 is connected by a bolt 9 to the lower end of the bearing 5. Thus, as the crank shaft 1 rotates, the slide adjusting screw 4 is moved vertically by the connecting rod 3.

On the outer periphery of the bearing 5 of the slide adjusting screw 4 is attached a worm wheel 10 which is rotatable but is held against vertical movement by the structure of the crown 2. An axially extending key groove 11 is provided on the inner surface of the worm wheel 10. A pin 12 secured to the bearing 5 projects into the key groove 11, so that the slide adjusting screw 4 rotates about the spherical portion 3*a* of the connecting rod 3 upon rotation of the worm wheel 10. Also, vertical movement of the connecting rod 3 can be effected independently of the worm wheel 10.

A worm shaft 13 engaged with the worm wheel 10 is provided in the crown 1, and a bevel gear 14 attached to the shaft end engages with a bevel gear 16 of a driving shaft 15. A timing belt 19 is connected between a gear 17 on the driving shaft 15 and the output shaft of a motor 18 so that the worm shaft 13 is rotationally driven by the motor 18.

Figure 3:
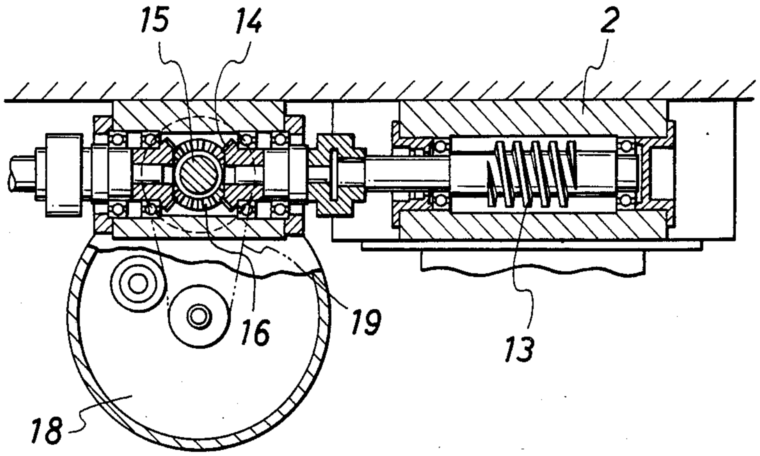
FIG. 3 is a sectional plan view of the driving mechanism of the worm shaft.
Figure 4:
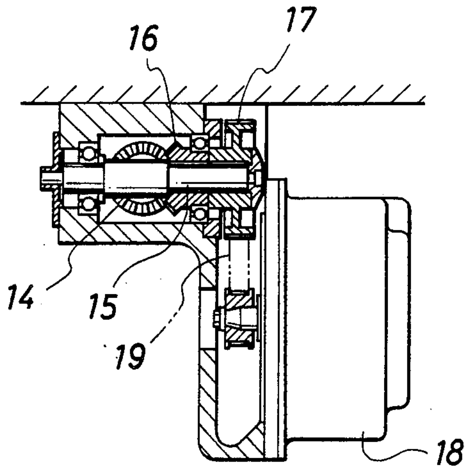
FIG. 4 is a vertical sectional view of the driving motor mounting.

In the embodiment, shown the motor 18 is an air motor. Referring to FIG. 3, the worm shaft 13 extends laterally on both sides of the motor 18. This construction is used when two connecting rods 3 are provided to drive the slide.

The cylindrical sleeve 8 of the slide adjusting screw 4 is threaded on its outer periphery as the well as inner periphery. A threaded member 32 fixed to a slide 32 by a cylindrical member 30 engages with the outer periphery of the cylindrical sleeve 8 while a threaded rod 34 of a piston 33, which is inserted and retained inside the cylindrical member 30 in a vertically movable manner threadedly engages with the inner periphery of the cylindrical sleeve 8. The bottom of the piston 33 and the cylindrical member 30 form an oil pressure chamber 35.

Figure 2:
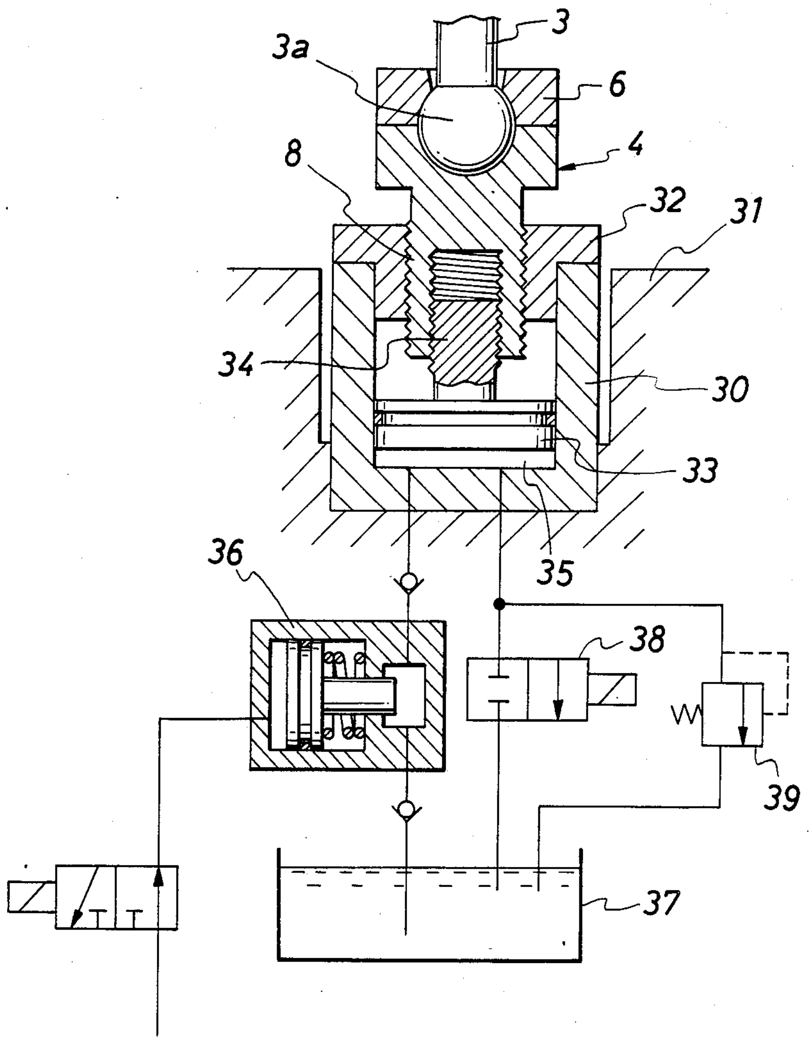
FIG. 2 is a diagram of the oil pressure circuit thereof.

The oil pressure chamber 35 is connected to an oil pressure tank 37 via an oil pressure circuit provided with an oil pressure pump 36, for example, as shown in FIG. 2, and is normally supplied with oil at a pressure of a predetermined level which is higher than the pressure of the press. The oil pressure chamber 35 and the oil pressure tank 37 are connected by means of a control valve 38 which is normally closed. Accordingly, when sticking occurs, the control valve 38 is opened to release the pressure in the oil pressure chamber 38 into the oil pressure tank 37. The reference number 39 denotes a relief valve provided between the control valve 38 and the oil pressure chamber 35.

When the press is operating under normal conditions, the above construction allows the oil pressure chamber 35 to be filled with oil at a pressure of predetermined level supplied from the oil pressure pump 36 as the control valve 38 is closed, as shown in FIG. 2.

The piston 33 is pushed upward by the oil pressure, so that the connecting rod 3 and the slide 31 are firmly and precisely positioned relative to each other. The pressing force applied by the connecting rod 3 is transmitted to the cylindrical member 30 and thus to slide 31 via the piston 33 by the oil pressure in the chamber 35.

On the other hand, when sticking occurs, the operation of the oil pressure pump 36 is suspended and the control valve 38 is opened. As a result, the oil pressure chamber 35 opens into the oil pressure tank 37 via the control valve 38 and the pressure in the chamber 35 is released to cancel the pushing force acting on the piston 33. As pressure in the chamber 35 is released and the pushing force on the piston 33 is cancelled, the pressure acting in the slide, die and the material due to sticking is absorbed to release sticking.

In the embodiment described above, the oil pressure circuit having the control valve 38 for relieving the pressure in the chamber 35 is provided independently. However, it is possible to have this circuit incorporated in an oil pressure circuit which includes the oil pressure pump 36.

What we claim is:

1. A press having a slide adjusting device and which comprises:

a press crown;

a crank shaft mounted on said crown and having an eccentric portion;

a connecting rod mounted on said eccentric portion;

a slide adjusting screw means connected to said connecting rod;

a worm wheel mounted on the outer periphery of said slide adjusting screw means for rotating said slide adjusting screw means with said worm wheel and for relative axial sliding movement of said slide adjusting screw means and said worm wheel;

means engaging said worm wheel for holding the worm wheel fixed against movement in the vertical direction relative to said press crown, whereby the slide adjusting screw means is moved in the rotational direction by rotation of said worm wheel and is slidable in the vertical direction in said worm wheel;

a worm shaft engaged with said worm wheel for rotating said worm wheel;

a motor mounted on said press crown and connected to said worm shaft for driving said worm shaft;

a press slide means threadedly engaged by the outer periphery of said slide adjusting screw means at the lower end thereof;

a piston vertically movably mounted on said press slide means with the upper portion thereof threaded to the lower end of said slide adjusting screw means;

said piston and said slide means defining an oil pressure chamber therebetween; and pressure means for supplying oil under pressure to said oil pressure chamber and a control valve for controlling the level of said oil pressure.

2. A press as claimed in claim 1 in which the inner peripheral surface of said worm wheel has a groove therein parallel to the axis thereof, and said slide adjusting screw means has a pin therein engaged in said groove.

3. A press as claimed in claim 1 in which said connecting rod has a spherical end thereon, and said slide adjusting screw means has a bearing engaged by the lower portion of said spherical end, and a bearing cap on said bearing engaging the upper portion of said spherical end, and a hollow cylindrical portion on the lower end of said bearing with which said press slide means and said piston are threadedly engaged.

4. A press as claimed in claim 3 in which said press slide means has a hollow cylindrical member threadedly engaged with the outer surface of said hollow cylindrical portion of said bearing, and said piston has a piston rod threaded into the inner part of said hollow cylindrical portion and is slidable in fluid tight engagement in said hollow cylindrical member.

* * * * *